Dec. 10, 1963 H. KIHN ETAL 3,114,047
DECODER CIRCUITS
Original Filed Jan. 31, 1957 3 Sheets-Sheet 1

INVENTORS
HARRY KIHN &
WILLIAM E. BARNETTE
BY Edward J. Norton
ATTORNEY

INVENTORS
HARRY KIHN &
WILLIAM E. BARNETTE
BY Edward J. Norton
ATTORNEY

Dec. 10, 1963 H. KIHN ETAL 3,114,047

DECODER CIRCUITS

Original Filed Jan. 31, 1957 3 Sheets-Sheet 3

INVENTORS
HARRY KIHN &
WILLIAM E. BARNETTE
BY Edward J Norton
ATTORNEY 3,114,047

DECODER CIRCUITS

Harry Kihn, Lawrenceville, N.J., and William E. Barnette, Levittown, Pa., assignors to Radio Corporation of America, a corporation of Delaware Original application Jan. 31, 1957, Ser. No. 637,532, now Patent No. 3,082,404, dated Mar. 19, 1963. Divided and this application Nov. 23, 1960, Ser. No. 71,203
4 Claims. (Cl. 307—88)

Figure 1:
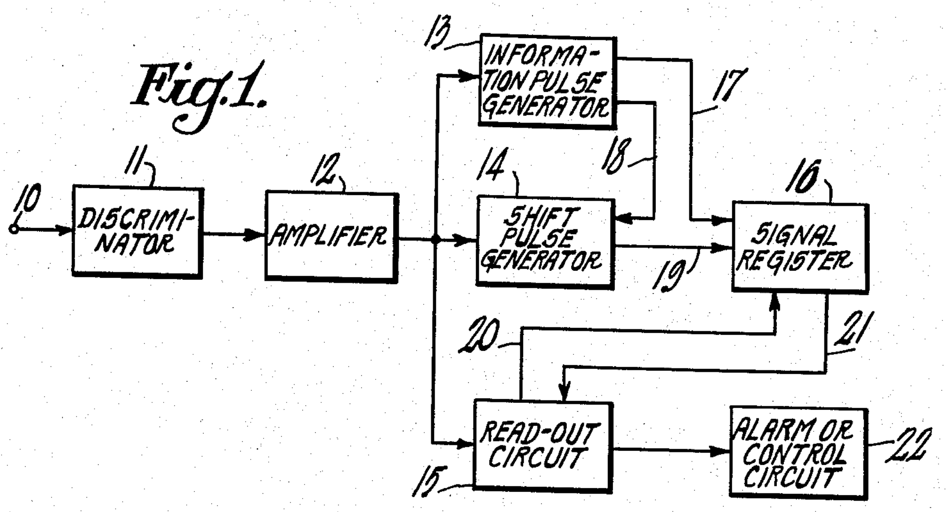

The invention relates to decoder circuits, and particularly, to a magnetic core-transistor decoder circuit. This application is a division of U.S. application Serial No. 637,532, filed January 31, 1957, now Patent Number 3,082,404, issued March 19, 1963.

A decoder circuit is generally defined as a circuit arrangement adapted to perform some function in response to a predetermined code signal. A number of decoder circuits each responsive to a different code signal can be used in a system such that the different decoder circuits can be selectively operated to perform their respective functions in a desired manner or sequence. One application of such a system is in the field of communications. By arranging the decoder circuits to operate alarm or similar device, a calling system is provided by which the various subscribers to the system can be paged or alerted to perform some activity. Both mechanical and electronic decoder circuits are known. The mechanical circuits make use of a number of relay and other mechanical switching devices, while the electronic circuits make use of a number of vacuum tubes and associated equipment. The number of vacuum tubes used in the electronic circuits requires the use of adequate power supplies and apparatus such as blowers for dissipating the heat generated by the tubes.

Increasing attention in the design and construction of equipment used in the field of electronics is being given to the conservation of space and to a reduction in the number of components. Size and weight are often critical factors to be considered in successfully building such equipment. Because of the number and size of the components required, it is difficult, if not impossible, to design decoder circuits using the mechanical and electronic decoder circuits now known which are small enough in construction and sufficiently light in weight to be useful in certain applications. The necessity of providing large power supplies and other apparatus creates many problems in any attempt to reduce the size or bulk and weight of the circuits. For example, it may be desirable to include the decoder circuits in equipment which is sufficiently small and light-weight in construction to be carried on the person. Equipment of this type using either the mechanical or electronic circuits now known would tend to be bulky and awkward to handle or slow in response requiring long signalling periods, thereby greatly decreasing its value and possibility of use. A definite need exists in the art for a decoder circuit which is small and capable of being made very compact in construction. In addition, it is highly desirable that the decoder circuit should be as dependable and as fast or faster in operation than the decoder circuits presently available.

An object of the invention is to obtain an improved decoder circuit which is smaller in construction and faster in operation than the decoder circuits now known.

Another object of the invention is to provide a magnetic core-transistor decoder circuit adapted to perform a given function in response to a predetermined code signal, the decoder circuit so provided being both smaller in construction and faster in operation than the decoder circuits now known.

Still another object of the invention is to obtain a portable and light-weight decoder circuit which can be carried on the person and requires a low voltage power supply.

In general, the decoder circuit according to the invention includes read-in, storage and read-out circuits. The read-in circuit functions to receive the signal elements of a code signal and to insert the signal elements into the storage circuit. The storage circuit functions to store the signal elements as they are inserted therein by the operation of the read-in circuit and, in addition, functions to hold in storage the signal elements of a code signal following the complete reception of the code signal by the read-in circuit such that an electrical condition corresponding to the code signal is established and maintained in the storage circuit. The read-out circuit functions to check the nature of the electrical condition established in the storage circuit and to cause the performance of some action, for example, the activation of an alarm device, if a predetermined electrical condition is determined to exist in the storage circuit. If the electrical condition established in the storage circuit is different in nature from the predetermined electrical condition, the decoder circuit may be arranged such that it performs no further action.

An improved magnetic core shift register is used in the present invention to perform the storage functions, and offers definite advantages in its operational characteristics such as speed of operation, number and size of components required, and so on. Known types of magnetic core shift registers usually involve the use of RC (resistance-capacitance) delay networks and biasing networks using diodes in the connections between the respective magnetic cores included therein. The diodes are high impedance elements and always dissipate power. As a result, a high power drive or, in other words, a correspondingly large power supply is required when relatively large numbers of the elements are used in such known magnetic core shift registers.

In the operation of a magnetic core it is necessary to apply a magnetic field to the core for only a brief period of time in order to shift the core from an unsaturated state to a saturated state, if the field when applied is sufficiently large to change the state of the core. It might be thought advisable to take advantage of low average power operation, requiring a smaller power supply, by using apparatus in place of the diodes to produce short pulses of high peak current for shifting the state of the magnetic cores in a magnetic core shift register. However, the usual RC delay network included in the connection between magnetic cores in the known type magnetic core shift registers would distort the peak to average ratio of the short pulses because of the integration performed thereby, removing the value of such apparatus used in place of the conventional diodes. In constructing a decoder circuit according to the objects of the invention, considerable attention has been given to the space requirements of the storage circuit. If the magnetic core shift registers now available were used, considerable difficulty would be experienced due to the requirement of a large power supply and the operational problems discussed.

It is, therefore, a further object of the invention to obtain an improved storage circuit suitable for use in a decoder circuit which is both smaller in construction and faster in operation than the decoder circuits now available.

It is a still further object of the invention to provide a new and novel transistorized magnetic core shift register capable of low average power operation and suitable for use in a decoder circuit which is both smaller in construction and faster in operation than the decoder circuits now available.

Briefly, the objects of the invention are accomplished by a decoder circuit including a transistor-magnetic core circuit arrangement. A code signal including a series of positive and negative half sine wave pulses followed by a read-out or control pulse having a time duration approximately equal to the time duration of the series of half sine wave pulses is applied from suitable receiving equipment to a transistor amplifier included in the read-in circuit of the decoder circuit. In addition to the transistor amplifier, the read-in circuit includes first and second transistor monocycle oscillator type trigger generators which are hereinafter referred to as an information pulse generator and shift pulse generator, respectively. The information pulse generator functions in response to each half sine wave pulse of one polarity applied thereto from the transistor amplifier to feed an information pulse to a storage circuit including a transistorized magnetic core shift register constructed according to the invention. Provision is made for causing the shift pulse generator to feed a shift current pulse to the magnetic core shift register following each operation of the information pulse generator such that the information stored in the register is advanced or shifted therethrough. The shift pulse generator is arranged to function in response to each half sine wave pulse of the opposite polarity applied thereto from the transistor amplifier to feed a shift current pulse to the magnetic core shift register. In this manner, an electrical condition corresponding to the arrangement of the half sine wave pulses included in an incoming code signal is established and maintained in the magnetic core shift register forming a part of the storage circuit. Half sine waves are used for illustration only since square, triangular, Gaussian or other types of pulses may be used.

Following the complete reception of the series of half sine wave pulses by the read-in circuit and the establishment of an electrical condition corresponding thereto in the magnetic core shift register of the storage circuit, a third transistor monocycle oscillator type trigger generator, hereinafter referred to as the read-out pulse generator, is operated in response to the read-out pulse included in the incoming code signal and applied thereto from the transistor amplifier to apply current pulse to the magnetic core shift register. In addition to the read-out pulse generator, the read-out circuit of the decoder circuit includes a transistor multivibrator. The transistor multivibrator is responsive to an output signal produced by the operation of the magnetic core shift register upon the application of the current pulse from the read-out pulse generator to the magnetic core shift register. The transistor multivibrator operates in response to a given output signal which is produced by the magnetic core shift register when a predetermined electrical condition has been established therein to perform some action, for example, the operation of an alarm device. If an electrical condition other than the predetermined electrical condition has been established in the magnetic core shift register, an improper output signal is applied from the magnetic core shift register to the transistor multivibrator. The transistor multivibrator is non-responsive to the improper output signal and performs no further action. Since the electrical condition established in the magnetic core shift register of the storage circuit corresponds to the arrangement of half sine wave pulses included in the incoming code signal, the decoder circuit is only operated by the operation of the transistor multivibrator to perform a desired action such as the operation of an alarm device in response to the reception by the decoder circuit of a proper and predetermined code signal. The decoder circuit is arranged to perform no action in response to a code signal other than the predetermined code signal.

Figure 3:
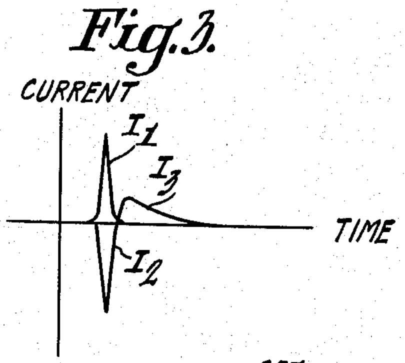
Figure 4:
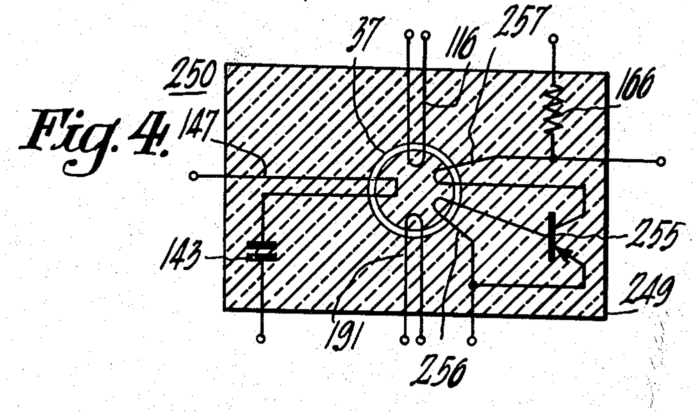
Figure 2A:
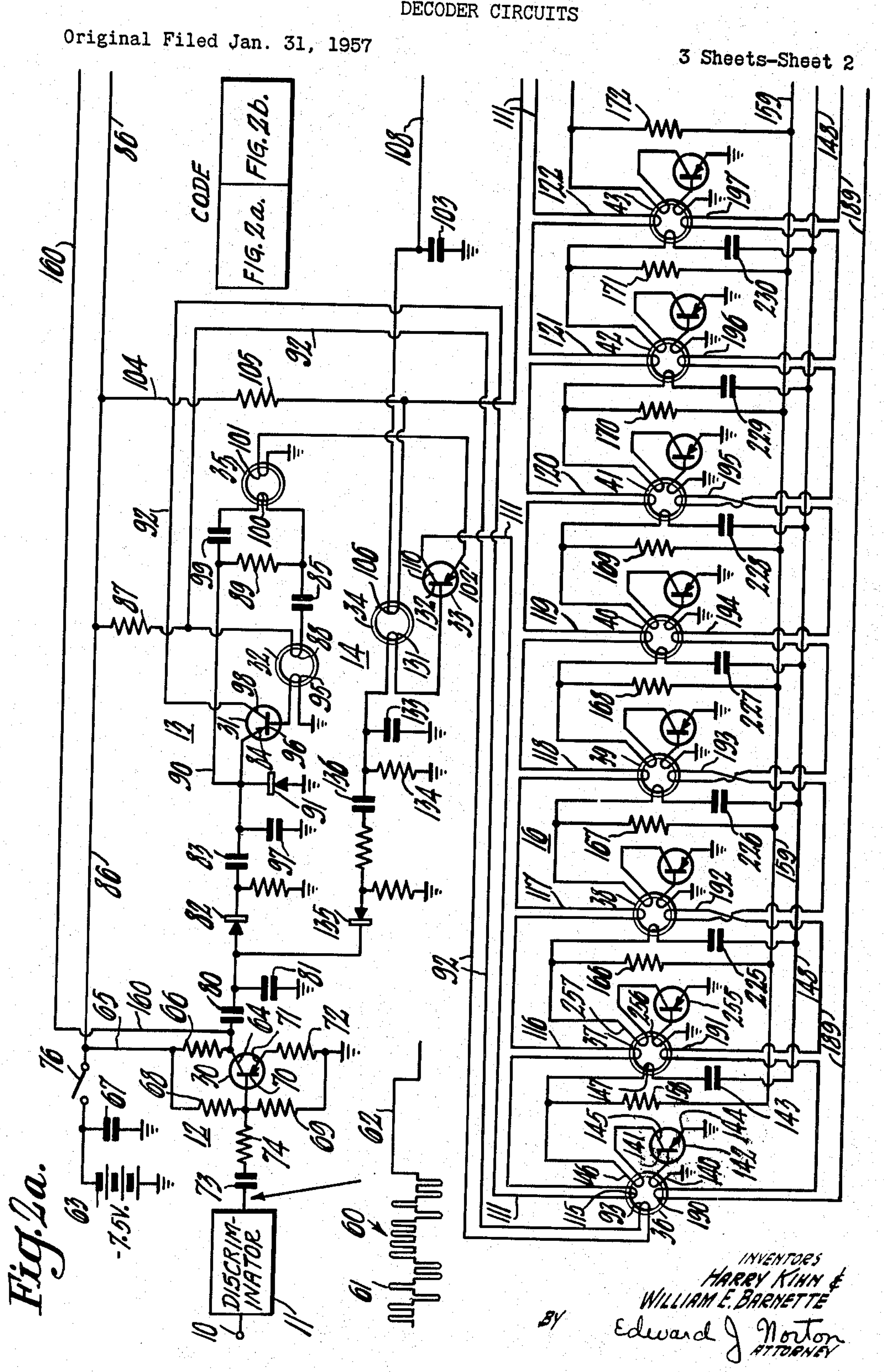
Figure 2B:
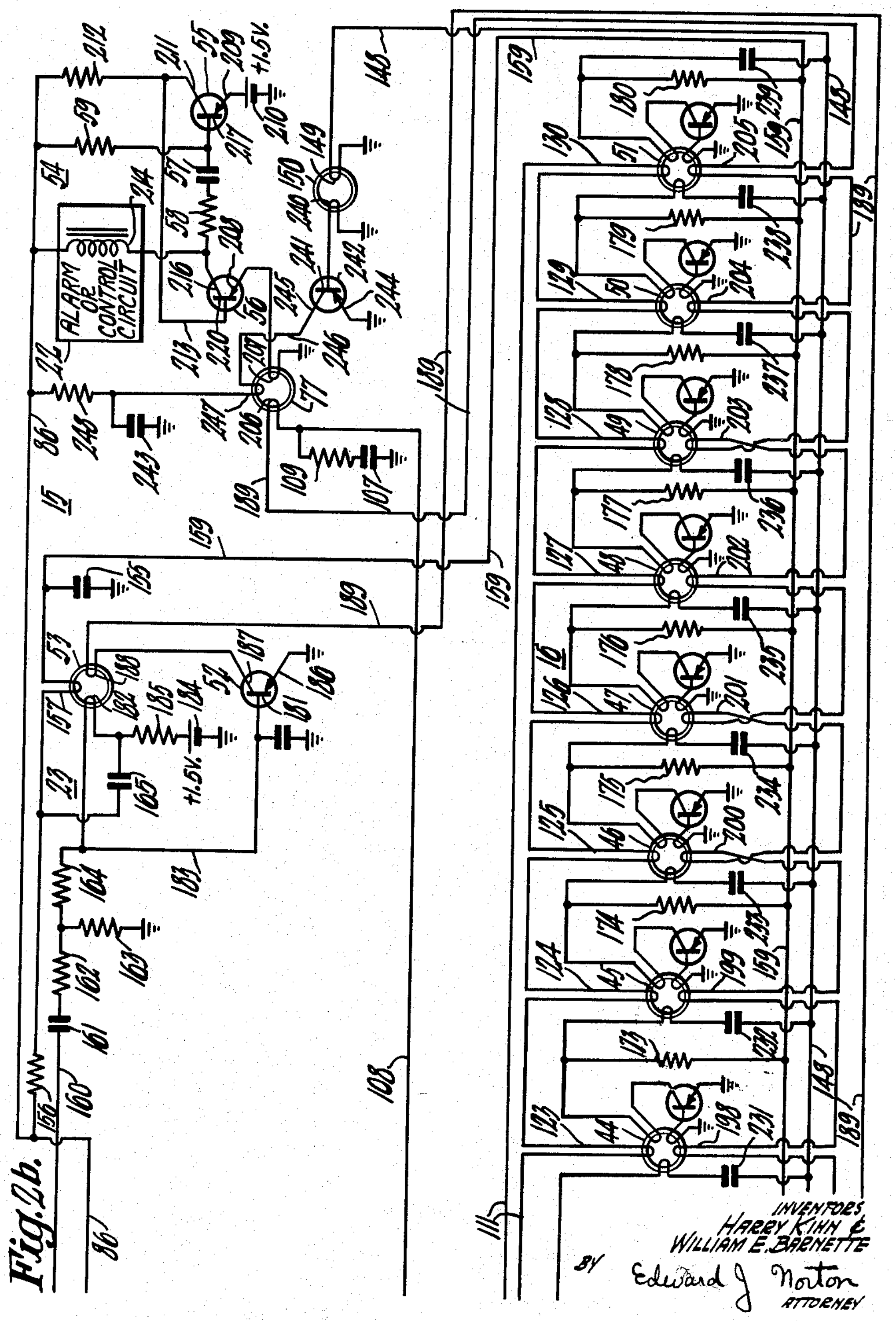

A more detail description of the invention will be given in connection with the accompanying drawing in which:

FIGURE 1 is a block diagram of one embodiment of the decoder circuit according to the invention;

FIGURE 2, FIGURES 2*a* and 2*b* taken together, is a circuit diagram given by way of example and arranged in the manner of the block diagram shown in FIGURE 1 according to the invention;

FIGURE 3 is a chart used in explaining the operation of the magnetic core shift register shown in the circuit diagram of FIGURE 2; and, FIGURE 4 is a diagram in section shown the manner in which the magnetic core-transistor circuit arranged according to the invention and used in the magnetic core shift register shown in FIGURE 2 may be constructed as a single unit.

Referring to FIGURE 1, an input signal, for example, in the form of a carrier upon which is frequency modulated a predetermined number of serially appearing positive and negative half cycle sine wave pulses followed by a read-out or control pulse is applied to an input terminal 10. The read-out pulse is of a time duration approximately equal to that of the series of half sine wave pulses but may be considerably longer for increased safety or shorter for increased speed. In describing the invention, it will be assumed that the signal applied to the terminal 10 originates at a transmitting station which functions to transmit the signal over a radio channel using frequency modulation. The signal is received by receiving equipment of conventional design including the usual mixer and intermediate frequency stages and is applied from the receiving equipment to the terminal 10.

The invention is not to be considered as limited to the use thereof in a frequency modulation system. If a radio channel is used, the signal may be sent by the transmitting station using any of the known forms of transmission. For example a carrier may be varied in phase or amplitude by the imposition upon it of the signal, utilizing known transmitting and receiving equipment. In certain applications, the signal may be applied directly to the decoder circuit of the invention over a conventional long line transmission system.

The frequency modulated carrier is applied from the terminal 10 to a discriminator 11. The discriminator 11 operates in a manner understood in the art to remove the incoming signal from the frequency modulated carrier wave by changing modulations in terms of frequency variation into amplitude variation. The signal is applied from the discriminator 11 to an amplifier 12. The amplifier 12 is biased to provide amplification of both the positive and negative half since wave pulses. The signal is fed from the amplifier 12 to an information pulse generator 13, a shift pulse generator 14 and a read-out circuit 15. The information pulse generator 13 is only responsive to each half sine wave pulse of one polarity to apply a signal pulse to a signal register 16 over a lead 17. As will be described, the signal register 16 includes a transistorized magnetic core shift register which functions as the storage circuit of the decoder circuit according to the invention. The shift register is of the type in which information can be stored by causing the respective magnetic cores included therein to assume given electrical conditions, the information being advanced or shifted from core-to-core through the shift register by the application of shift current pulses to the magnetic cores.

Following each operation of the information pulse generator 13 to apply a signal pulse to the signal register 16, a control signal is applied from the information pulse generator 13 to the shift pulse generator 14 over a lead 18. The shift pulse generator 14 is responsive to the control signal to apply a shift current pulse to the magnetic cores in the signal register 16 over a lead 19. The shift current pulse causes the information stored in the magnetic cores of the signal register 16 by the application of the signal pulses to the signal register 16 from the information pulse generator 13 to be shifted from core-to-core through the signal register 16.

While the information pulse generator 13 is responsive to the half sine wave pulses of one polarity included in the incoming signal, it is not responsive to the half sine wave pulses of the opposite polarity. The shift pulse generator 14 is responsive to each of the half sine wave pulses of the opposite polarity to apply a shift current pulse to the magnetic cores in the signal register 16, causing the information stored in the magnetic cores of the signal register 16 to be shifted from core-to-core through the signal register 16. In accordance with the circuit operations described, therefore, the information pulse generator 13 is responsive to each half sine wave pulse of one polarity to apply a signal pulse to the signal register 16. While the shift pulse generator 14 is not responsive to the half sine wave pulses of the one polarity, it is responsive to the control signal supplied thereto from the information pulse generator 13 to apply a shift current pulse to the signal register 16. Upon the reception of each half sine wave pulse of the opposite polarity, the shift pulse generator 14 is operated to apply a further shift current pulse to the signal register 16. The signal pulses and shift pulses are very narrow compared to the input half cycle sine wave pulses to simplify delay circuitry and to conserve power. In this manner, the magnetic cores in the signal register 16 are made to assume electrical conditions representative of the polarity of the half sine wave pulses included in the incoming signal. Upon the complete reception of the series of half sine wave pulses by the decoder circuit, an electrical condition is established in the signal register 16 corresponding to the arrangement of half sine wave pulses in the incoming signal.

The read-out circuit 15 is responsive to the read-out pulse included in the incoming signal following the series of half sine wave pulses to apply a current pulse to the signal register 16 over lead 20. The magnetic cores arranged to form the magnetic core shift register included in the signal register 16 are interconnected in such a manner that an output signal according to the electrical condition established in the signal register 16 is produced upon the reception by the signal register 16 of the interrogation current pulse. The output signal is applied from the signal register 16 to the read-out circuit 15 over a lead 21. The read-out circuit 15 is arranged to be responsive to a given output signal produced by the signal register 16 when a predetermined electrical condition has been established in the signal register 16 to apply an operating signal to an alarm or control circuit 22. The circuit 22 may be designed to perform any desired function. For example, it may be arranged to control the operation of other equipment in a desired manner as in telemetering, and so on. For purposes of description, it will be assumed that the circuit 22 acts as an alarm circuit to operate a lamp or sounding device. When an electrical condition other than the predetermined electrical condition has been established in the signal register 16, an improper output signal is applied from the signal register 16 to the read-out circuit 15 and the read-out circuit 15 performs no further action. Since the electrical condition established in the signal register 16 corresponds to the incoming signal, the decoder circuit of the invention is operated by the operation of the read-out circuit 15 to energize the alarm circuit 22 only when a predetermined signal has been received. If a signal other than the predetermined signal is received, the decoder circuit is arranged such that the alarm circuit 22 is not energized. A number of decoder circuits constructed according to the invention can be readily arranged in a communication system, each of the decoder circuits being responsive only to the code signal assigned thereto to perform a desired function.

A circuit diagram of one embodiment of the invention is given by way of example in FIGURE 2. The read-in circuit of the invention includes an amplifier stage 12, an information pulse generator 13 and a shift pulse generator 14. The amplifier stage 12 includes a transistor 30. The transistor 30, as well as the other transistors included in the circuit diagram, are shown and will be described as P-N-P junction type transistors of N type conductivity. The transistors are of conventional design and each include a collector, emitter and base electrode. A transistor suitable for use is designated in the art as the 2N105 transistor. However, the invention is not limited to the use of this particular type of transistor. Transistors of P type conductivity may be used in the circuit in place of the transistors shown by changing the polarity of the voltage applied to the respective electrodes of the transistors in a manner understood in the art. The information pulse generator 13 is a monocycle oscillator type trigger generator and includes a transistor 31 and a magnetic core 32. The shift pulse generator 14 is also a monocycle oscillator type trigger generator and includes a transistor 33 and a magnetic core 34. A connection is provided between the information pulse generator 13 and the shift pulse generator 14 including a magnetic core 35 for performing a function to be described.

The storage circuit of the invetnion includes a signal register 16 comprising a train of magnetic cores 36 through 51. The magnetic cores 36 through 51 are arranged in a magnetic core shift register of the type generally referred to in the art as a single-core-per-bit shift register. A delay means including a transistor circuit constructed according to the invention is provided between succeeding magnetic cores in the train.

The read-out circuit 15 of the invention includes a monocycle oscillator type trigger generator 23 defined as a read-out pulse generator comprising a transistor 52 and a magnetic core 53. In addition to the read-out pulse generator 23, the read-out circuit 15 includes a transistor multivibrator 54 having a single stable state of operation. The multivibrator 54 includes a first transistor 55 which is normally conducting and a second transistor 56 which is normally cut-off. Upon the reception of an input pulse, transistor 56 becomes conducting and transistor 55 is cut-off. Following a time interval determined by the time constant of the circuit including capacitor 57 and resistors 58, 59, the multivibrator 54 automatically returns to its single stable state in which transistor 55 is conducting and transistor 56 is cut-off. In other words, the reception of a single input pulse causes the multivibrator 54 to be triggered into an unstable state, the multivibrator 54 automatically returning to the single stable state thereafter. This type of multivibrator is generally referred to in the art as a monostable multivibrator. An alarm circuit 22 is included in the collector circuit of the transistor 56 and is arranged to be operated during the periods in which the multivibrator 54 is triggered into its unstable state. A connection including a magnetic core 77 is completed between the signal register 16 and the multivibrator 54 for applying an inpult pulse to the multivibrator 54 in a manner to be described.

The size and weight of the decoder circuit of the invention is minimized by using magnetic cores to perform functions previously performed by other electrical equipment. The operation and construction of magnetic cores per se is known in the art and, therefore, a detailed description thereof is unnecessary. A magnetic core is a circuit element having a substantially rectangular hysteresis loop of low coercive force. Certain materials such as molybdenum permalloy and manganese-magnesium ferrite exhibit a substantial rectangular hysteresis loop. A magnetic core is capable of being magnetized to saturation in either one of two directions. In one direction, a positive or active state is said to arise in which the direction of retentivity is opposite to that which would result from the application of a shift or sensing pulse to the magnetic core. In the second direction, a negative or inactive state is said to arise in which the direction of retentivity is the same as that which would result from the application of a shift pulse to the magnetic core. A magnetic core in the active or positive state is said to contain a "one," and a magnetic core in the negative or inactive state is said to contain a "zero." When a magnetic core is shifted from an active state to an inactive state, a voltage of one polarity is induced in an output winding on the core. A voltage of the opposite polarity is induced in the output winding on the core when the magnetic core is shifted from an inactive to an active state. The polarity of the voltage in each case will depend upon the direction in which the output winding is wound on the core.

In the operation of the decoder circuit of the invention, a frequency modulated carrier is applied from suitable receiving equipment to the input terminal 10. The modulated carrier is applied from the terminal 10 to a discriminator 11. The discriminator 11 functions to remove the incoming code signal from the frequency modulated carrier wave by changing modulations in terms of frequency variation into amplitude variation. An example of a code signal 60 appearing at the output of the discriminator 11 is given in FIGURE 2. The code signal 60 includes a series of positive and negative half sine wave pulses 61. While a series of fourteen such pulses 61 is shown, the number may be varied in different applications as will become apparent from the description. The positive and negative pulses are arranged in a given order so as to form a predetermined code signal. A read-out pulse 62 follows the series of half sine wave pulses 61 and is of a duration approximately equal to that of the series of pulses 61. The read-out pulse 62 is made of sufficient duration to permit the completion of the read-out functions by the decoder circuit.

On the start-up of operation, an on-off switch 76 is closed. A negative voltage is applied from the negative terminal of a source of unidirectional potential shown as a 7.5 v. battery 63 to the collector 64 of the transistor 30 over an electrical path including lead 65 and resistor 66. A filter capacitor 67 is connected across the battery 63. A negative bias is developed across a voltage dividing network including resistors 68, 69 and applied to the base 70 of the transistor 30. The emitter 71 of the transistor 30 is connected to ground over an electrical path including resistor 72. The term ground, as used in the specification, is to be understood as referring to a point of fixed reference potential. The emitter 71 is positive with respect to the base 70, while the collector 64 is negative with respect to the base 70. The transistor 30 becomes and remains conducting.

The received code signal 60 is applied from the discriminator 11 to the base 70 of the transistor 30 over an electrical path including a capacitor 73 and a resistor 74. The resistor 74 functions to present a high impedance in the electrical path such that a high impedance discriminator 11 may be used. The transistor 30 is biased to provide amplification of both the positive and negative signal pulses 61 included in the code signal 60 with positive and negative saturation occurring at about the same input level. The reception of each positive pulse causes the transistor 30 to approach cut-off such that a negative pulse is produced in the collector circuit thereof, while the reception of each negative pulse causes the transistor 30 to conduct more heavily such that a positive pulse is produced in the collector circuit thereof. In this manner, the respective pulses included in the code signal 60 are each amplified and reversed in polarity by the operation of the transistor.

The code signal appearing in the collector circuit of the transistor 30 is applied from the amplifier stage 12 to the read-out circuit 15. The code signal is also applied to the pulse generators 13, 14 over an electrical path including a coupling circuit comprising capacitor 80 and capacitor 81 connected to ground. A unidirectional device shown as a rectifier 82 is connected in series with the input to the information pulse generator 13. For the sake of description, various other unidirectional devices located elsewhere in the circuit diagram have also been shown as rectifiers, for example, of the type designated in the art by the reference 1N192. It is to be understood, however, that other known devices designed to pass current in only one direction may be used in place of the rectifiers shown. The rectifier 82 is poled in the proper direction to pass only the positive half sine wave signal pulses included in the incoming code signal to the information pulse generator 13. The positive pulses are differentiated by the series capacitor 83 and the low input resistance of the emitter fed transistor 31. A differentiated positive pulse applied to the emitter 84 of the transistor 31 causes the transistor 31 to conduct. A capacitor 85 is normally charged negatively over an electrical circuit including the battery 63, switch 76, lead 86, resistor 87, a 50 turn winding 88 on the magnetic core 32, resistor 89, lead 90, and a rectifier 91. For the sake of description, reference will be made to the number of turns in the various windings on the respective ferrite magnetic cores used in a decoder circuit which has been constructed according to the circuit diagram given in FIGURE 2. The number of turns indicated in each case, however, is given only by way of example and may be changed to meet requirements of a particular application.

When the transistor 31 becomes conducting, the capacitor 85 discharges. Current flows over an electrical path including collector 98, lead 92, the 20 turn input winding 93 on the first magnetic core 36 in the signal register 16, the winding 88 on the magnetic core 32, capacitor 85, resistor 89, lead 90 and emitter 84. The magnetic core 32 is normally set in a "one" state. The voltage induced in the winding 88 is in the proper polarity to start a shifting of the magnetic core 32 from a "one" state into a "zero" state. A negative voltage is induced in a 100 turn winding 95 on the magnetic core 32 and included in the base circuit of the transistor 31, driving the base 96 of the transistor 31 negative. As a result of this regenerative action, the transistor 31 conducts more heavily. The increased current flows causes the magnetic core 32 to complete its shift into the "zero" state. Following the discharge of the capacitor 85 and the shifting of the magnetic core 32 from a "one" into a "zero" state, the feedback to the transistor 31 drops to zero because the coupling between the windings 88, 95 on the magnetic core 32 drops essentially to zero. The transistor 31 ceases to conduct, and capacitor 85 again charges over the circuit outlined above. The reversed current flow causes a voltage to be induced in the winding 88 of the proper polarity to reset the magnetic core 32 to the "one" state. The information pulse generator 13 is ready to operate upon the reception of the next positive signal pulse included in the incoming code signal.

A capacitor 97 is connected in parallel with the rectifier 91 shunting the emitter 84 input. The capacitor 97 charges negatively when the information pulse generator 13 is triggered. This negative charge biases off the emitter 84 immediately after the triggering of the transistor 31 so that the transistor 31 can not be triggered again until the capacitor 97 has discharged through the rectifier 91 to a sufficiently low level. The value of the capacitor 97 is determined so as to prevent the retriggering of the transistor 31 by the same received positive pulse. At the same time, the value of the capacitor 97 is determined so that the capacitor 97 will be discharged by the time the next pulse included in the incoming code signal is received, permitting the triggering of the transistor 31 if the next pulse is positive in nature. The parallel connected rectifier 91 cuts the discharge time of the capacitor 97 to a low enough value to accommodate a desired code rate. It has been found that a code rate up to approximately 1500 cycles per second can be accommodated. Since the rectifier 91 only conducts in the negative direction, it does not load the positive signal pulses applied to the emitter 84.

The triggering of the information pulse generator 13 in the manner described produces a very sharp pulse, for example, of 3 microseconds duration, in the collector circuit of the transistor 31. As pointed out above, input winding 93 on the first magnetic core 36 in the signal register 16 is connected in series with the winding 88 of the magnetic core 32. The application of the pulse to the input winding 93 causes a voltage of the proper polarity to be induced in the input winding 93 such that the magnetic core 36 is shifted into a "one" state.

Reference was also made above to the resistor 89 connected in series with the winding 88 on the magnetic core 32. A capacitor 99 in series with a ten turn winding 100 on the magnetic core 35 is connected in shunt with the resistor 89. The capacitor 99 charges when the information pulse generator 13 triggers and discharges immediately afterward. During the period in which capacitor 99 charges, a voltage of the proper polarity is induced in the winding 100 to cause the magnetic core 35 to shift into a "one" state, resulting in a negative voltage being induced in a forty turn winding 101 on the core 35. When the capacitor 99 discharges after the triggering of the information pulse generator 13, a voltage of the opposite polarity is induced in winding 100, causing the magnetic core 35 to shift into a "zero" state. A positive voltage is induced in the winding 101. The positive voltage results in the application of a positive pulse to the emitter 102 of transistor 33 included in the shift pulse generator 14. The transistor 33 becomes conducting.

A capacitor 103 is normally charged over a path including battery 63, switch 76, lead 86, lead 104, resistor 105 and a fifty turn winding 106 on the magnetic core 34. A further capacitor 107 connected in parallel with capacitor 103 is normally charged over the charging path of capacitor 103, lead 108 and resistor 109. When transistor 33 conducts, capacitors 103 and 107 discharge and current flows over an electrical path including the collector 110, lead 111, the five turn shift windings 115 through 130 on the magnetic cores 36 through 51, respectively, in the signal register 16, the winding 106 on the magnetic core 34, a ground return, the winding 101 on magnetic core 35 and emitter 102. The magnetic core 34 is normally in a "one" state. The voltage induced in the winding 106 causes the magnetic core 34 to start to shift into a "zero" state. A negative voltage is induced in a one hundred turn winding 131, biasing the base 132 of transistor 33 negative. Transistor 33 conducts more heavily. The increased current flow resulting from this regenerative action causes the magnetic core 34 to complete its shift into a "zero" state. When the magnetic core 34 becomes saturated, the coupling through the core 34 dropping essentially to zero, the transistor 33 is cut-off. Capacitors 103 and 107 charge over the charging paths described. A voltage of opposite polarity is induced in the winding 106, resetting the magnetic core 34 in a "one" state. The shift pulse generator 14 is operated in this manner to apply a very sharp positive pulse, for example, of 3 microseconds duration, to the shift windings 115 through 130 on the magnetic cores 36 through 51, respectively. The operation of the magnetic core 35 is such that the shift pulse will be applied to the shift windings 115 through 130 by the triggering of the shift pulse generator 14 approximately one pulse width or more after the application of the input pulse to the input winding 93 on magnetic core 36 by the triggering of the information pulse generator 13.

A capacitor 133 in the base circuit of transistor 33 is charged positively during the triggering of the shift pulse generator 14 by the voltage across the winding 131. After the shift pulse generator 14 has triggered, capacitor 133 discharges through a resistor 134 in shunt therewith. The base 132 is biased positive, preventing the accidental triggering of the shift pulse generator 14. The value of the capacitor 133 and resistor 134 is set so that the capacitor 133 will be discharged by the time a next code signal pulse is received such that the shift pulse generator 14 will be triggered in response to the signal pulse if it is negative in nature.

The shift pulse generator 14 includes a rectifier 135 connected in series with its input. The incoming code signal appearing in the collector circuit of transistor 30 is applied to the rectifier 135, as well as to the rectifier 82 in the information pulse generator 13. The rectifier 135 is poled in the proper direction to pass only the negative code signal pulses included in the incoming signal. The negative pulses are differentiated by a series capacitor 136 and the resistor 134 in shunt with the base input of the transistor 33. The application of the negative voltage to the base 132 upon the reception of each negative signal pulse causes transistor 33 to conduct. The operation of the shift pulse generator 14 will be the same as described above. A very sharp pulse is produced and applied to the shift windings 115 through 130 on the magnetic cores 36 through 51, respectively, in the signal register 16.

As the incoming code signal is received, therefore, the information pulse generator 13 is operated in response to each positive signal pulse to apply an input pulse to the winding 93 on the magnetic core 36 in the signal register 16. Immediately after each operation of the information pulse generator 13, the shift pulse generator 14 is automatically operated by the operation of the magnetic core 35 to apply a shift pulse to the shift windings 115 through 130 on the magnetic cores 36 through 51, respectively, in the signal register 16. The shift pulse generator 14 is operated in response to each negative signal pulse included in the incoming code signal to apply a shift pulse to the windings 115 through 130.

The operation of the storage circuit including signal register 16 will now be described. Various types of magnetic core shift registers are known. Such shift registers include a number of magnetic cores arranged in a train, each of the magnetic cores having at least an input, output and shift winding mounted thereon. The output winding on each one of the magnetic cores is connected to the input winding on the next magnetic core in the train. The shift windings are usually connected in series relationship to a suitable source of shift current pulses. In the operation of the shift register, the first magnetic core in the train is made to assume a "one" state. Thereafter, a shift pulse is applied to the shift windings on all of the magnetic cores in the train. This action causes the "one" to be read out of the first magnetic core and into the next or second magnetic core in the train. That is to say, the first magnetic core shifts into a "zero" state, while the second magnetic core is made to shift into a "one" state. A voltage induced in the output winding on the first magnetic core causes current to flow over the connection between the first and the second magnetic core in the train. The voltage induced in the input winding on the second magnetic core causes the second magnetic core to shift into a "one" state. It is essential that the voltage be induced in the input winding on the second magnetic core after the shift pulse has been applied thereto. The simultaneous application of the shift pulse to the shift winding and of the input pulse to the input winding on the second magnetic core would result in a cancellation of the pulses, causing the second magnetic core to remain in its present state. Delay means are, therefore, provided in the connection between the first and second magnetic cores to delay the application of the input pulse to the second magnetic core until after the shift pulse has been applied to the shift windings on all the magnetic cores in the train. Similar delay means are provided between each succeeding pair of magnetic cores in the train. As additional shift pulses are applied to the shift windings on the magnetic cores in the train, the "one" stored in the second core is made to advance core-by-core along the train of magnetic cores. In this manner, information can be fed into and stored in the shift register.

In one type of magnetic core shift register, a magnetic core is included in the connection between succeeding magnetic cores in the train to perform the delay function referred to above. This type of shift register is generally referred to in the art as a two-core-per-bit shift register. The use of the additional magnetic cores in a shift register, however, limits the speed of operation and involves the use of additional circuits and equipment, creating problems of power supply, and so on. Magnetic core shift registers are also available which involve the use of RC (resistance-capacitance) delay networks and biasing networks using diodes to perform the delay and advance functions. The disadvantages of the latter type of magnetic core shift registers have been previously mentioned. In designing the decoder circuit of the invention, it was necessary to give attention to the number and size of components required in the construction and operation of the magnetic core shift or signal register 16 of the storage circuit. A magnetic core shift register is disclosed by the invention which is capable of low average power operation and offers definite advantages in its operational characteristics such as speed of operation, number and size of components required, and so on.

It will be assumed for the moment that a positive signal pulse included in the incoming code signal appears in the collector circuit of transistor 30. The rectifier 82 will pass the positive pulse, and the information pulse generator 13 is triggered in response thereto. A pulse is applied to the input winding 93 on the magnetic core 36. The current in the input winding 93 is of the proper polarity to cause the magnetic core 36 to shift into a "one" state. Immediately thereafter the shift pulse generator 14 automatically functions to apply a shift pulse to winding 115. The magnetic core 36 starts to shift into a "zero" state. A negative voltage is induced in a twenty turn winding 140, biasing the base 141 of a transistor 142 negative. Transistor 142 becomes conducting, A capacitor 143 is normally charged over a path to be described. When transistor 142 conducts, capacitor 143 discharges. Current flows over an electrical path including emitter 144, collector 145, a twenty turn winding 146 on the magnetic core 36, a twenty turn input winding 147 on the magnetic core 37, lead 148 and a one turn winding 149 on a magnetic core 150. The voltage induced in the winding 146 causes an increase in the negative bias applied to the base 141 by the voltage induced in the winding 140. Transistor 142 is made to conduct more heavily. As a result of this regenerative action, the magnetic core 36 is shifted into the "zero" state. The current pulse in the winding 147 during the period in which capacitor 143 is discharging is of a polarity to cause the magnetic core 37 to shift into a "zero" state. If the magnetic core 37 is already in a "zero" state, no action will occur. If the magnetic core 37 is in a "one" state, the voltage induced in the input winding 147 will assist the shift pulse applied to the winding 116 in shifting the magnetic core 37 from a "one" into a "zero" state.

When the magnetic core 36 is saturated in a negative direction or, in other words, a "zero" is stored therein, the transistor 142 ceases conducting since the base 141 is no longer biased negative. A large value capacitor 155 in the read-out pulse generator 23 is normally charged negatively over an electrical path including battery 63, switch 76, lead 86, resistor 156 and a ten turn winding 157 on the magnetic core 53. When the transistor 142 ceases conducting, capacitor 143 charges and capacitor 155 discharges an amount depending upon the number of other similar register stages also triggered at this time. Current flows over an electrical path including winding 149 on the magnetic core 150, lead 148, capacitor 143, winding 147 on the magnetic core 37, resistor 158, lead 159 and capacitor 155. The current pulse applied to the winding 147 is in the proper polarity to cause the magnetic core 37 to shift from a "zero" state into a "one" state. In this manner, therefore, the "one" is read out of the magnetic core 36 and is read into the magnetic core 37, the transistor 142-capacitor 143 circuit providing the necessary delay. If the next signal pulse included in the incoming code signal should be negative in nature, the shift pulse generator 14 will function to apply a shift pulse to the shift winding 116 on the magnetic core 37. The "one" stored in the magnetic core 37 will be read out of the magnetic core 37 and will be read into the magnetic core 38 following the circuit operations described, and so on.

A clear understanding of the transistor 142-capacitor 143 circuit in the connection between succeeding magnetic cores 36, 37 in the signal register 16 may be had by an examination of the chart given in FIGURE 3 in which current is plotted against time. The curve $I_1$ represents the period during which the transistor 142 is conducting, while curve $I_2$ represents the discharge time of the capacitor 143. When the transistor 142 ceases conducting, the capacitor 143 charges to produce the curve $I_3$ which is in the proper direction to insert a "one" into the magnetic core 37. While FIGURE 3 has been described in connection with the operation of the magnetic cores 36, 37, the operation of the remaining stages in the signal register 16 will be exactly the same. A "one" stored in any of the magnetic cores 36 through 51 will be advanced core-by-core through the signal register 16 as shift current pulses are applied to the shift windings 115 through 130 by the operation of the shift pulse generator 14.

It will now be assumed that a code signal corresponding to the code signal 60 shown in FIGURE 2 is received by the decoder circuit. The signal pulses 61 and the read-out pulse 62 are first amplified and reversed in polarity by the operation of the transistor circuit 30. The first, second, fourth, seventh, eighth, ninth, tenth and twelfth signal pulses 61, as well as the read-out pulse 62, will appear as negative pulses in the collector circuit of the transistor 30, while the third, fifth, sixth, eleventh, thirteenth and fourteenth signal pulses 61 will appear as positive pulses. The information pulse generator 13 will function to insert a "one" into the magnetic core 36 in response to each positive signal pulse passed by the rectifier 82, the "one" inserted into the magnetic core 36 being, thereafter, automatically advanced out of the magnetic core 36 and into the magnetic core 37 by the operation of the magnetic core 35 and the shift pulse generator 14. The shift pulse generator 14 will function in response to the negative signal pulses passed by the rectifier 135 to apply a shift current pulse to the shift windings 115 through 130. The operation of the signal register 16 in response to the operation of the information pulse generator 13 and to that of the shift pulse generator 14 can be followed from the circuit operations outlined above. Upon the reception of the fourteenth signal pulse 61, appearing as a positive pulse in the collector circuit of the transistor 30, a "one" will be stored in the magnetic cores 48, 46, 45, 40, 38 and 37 corresponding to the third, fifth, sixth, eleventh, thirteenth and fourteenth positive signal pulses included in the incoming code signal and appearing in the collector circuit of the transistor 30. The leading edge of the negative read-out pulse 62 appearing in the collector circuit of the transistor 30 is passed by the rectifier 135 and causes the shift pulse generator 14 to trigger. The shift current pulse applied to the shift windings 115 through 130 causes each "one" to be advanced into the next magnetic core in the signal register 16. Therefore, following the complete reception of the incoming code signal 60, a "one" is stored in the magnetic cores 49, 47, 46, 41, 39 and 38, corresponding to the third, fifth, sixth, eleventh, thirteenth and fourteenth positive signal pulses appearing in the collector circuit of the transistor 30. A "zero" is stored in the magnetic cores 51, 50, 48, 45, 44, 43, 42 and 40, corresponding to the first, second, fourth, seventh, eighth, ninth, tenth and twelfth negative signal pulses appearing in the collector circuit of the transistor 30. A "zero" will be stored in the magnetic core 37 due to the reception of the negative read-out pulse 62. Because of the automatic operation of the shift pulse generator 14, the magnetic core 36 has a "zero" stored therein. In this connection, it should be noted that with the exception of the brief period in which a "one" is inserted in the magnetic core 36 by the operation of the information pulse generator 13, the magnetic core 36 will remain in a "zero" state.

An electrical condition is, therefore, established and maintained in the signal register 16 corresponding to the incoming code signal by the storage action performed by the respective magnetic cores 36 through 51. While only one code signal 60 has been shown by way of example, the operation of the signal register 16 will be similar to that described in response to any other incoming code signal. In a decoder circuit designed to accommodate an incoming code signal including 14 signal pulses, as shown in FIGURE 2, the number of possible codes using the binary number system is greater than 16,000 or $2^{14}$. Code signals including more than or less than 14 signal pulses can be accommodated by adding to or subtracting from the signal register 16 the desired number of magnetic core stages. As the number of signal pulses included in the incoming code signal is increased, a correspondingly greater number of codes are, of course, possible. The arrangement used will depend upon the requirements of the particular application.

As the signal pulses appearing in the collector circuit of the transistor 30 are applied to the information pulse generator 13 and to the shift pulse generator 14, they are also applied to the read-out pulse generator 23 in the read-out circuit 15 over a lead 160. The signal pulses are fed through an isolation capacitor 161, the amplitude of the signal pulses being reduced by resistors 162, 163. The series resistor 164 and a shunt capacitor 165 serve as the integrating circuit for discriminating against the half sine wave signal pulses included in the respective circuits coupling succeeding magnetic cores in the signal register 16 correspond to the resistor 158 in the circuit coupling magnetic cores 36, 37. The resistors 158, 166 through 180 are all connected in common to the lead 159. In describing the operation of the coupling circuit between the magnetic cores 36, 37, it was mentioned that as the capacitor 143 charges through the resistor 158 to insert a "one" in magnetic core 37, capacitor 155 discharges a small amount. Because the capacitor 55 is connected in common to all of the resistors 158, 166 through 180 over lead 159, it it is clear that, as one or more of the magnetic cores 37 through 51 are shifted into a "one" state as a result of the application of a shift pulse to the shift windings 115 through 129 during the read-in period, a similar change in the condition of the capacitor 155 occurs. The charge developed across capacitor 155 becomes less negative each time a "one" is inserted into one or more of the magnetic cores 37 through 51.

The fluctuations in the voltage developed across the capacitor 155 is used to perform two functions. The magnetic core 53 is normally made to assume a "one" state. When the voltage across the capacitor 155 becomes less negative due to the current flow resulting from the firing of the register core circuit, a current flows in the winding 157 of the proper polarity to set and hold the magnetic core 53 in the "one" state. At the same time a positive voltage is applied to the capacitor 165, resulting in the base 181 of the transistor 52 being biased positively over an electrical path including a one hundred turn winding 182 on the magnetic core 53 and a lead 183. A small and constant positive voltage is applied to the base 181 from the positive terminal of a source of unidirectional potential represented by a 1.5 v. battery 184 over an electrical path including resistor 185, winding 182 and lead 183. As a result of the positive bias supplied by the battery 184 and of the additional positive bias supplied by the operation of the capacitor 155, transistor 52 is cut-off and is prevented from conducting in response to the signal pulses applied thereto from the collector circuit of the transistor 30. At the same time, the magnetic core 53 is held in a "one" state such that it can not be made to shift into a"zero" state. By this action, therefore, the sensitivity of the read-out pulse generator 23 is reduced during the read-in period of a cycle of operation such that the read-out pulse generator 23 is not operated in response to the signal pulses included in the incoming code signal, or due to feed back pulses from the readout windings during code storage in the register.

Following the reception of the series of signal pulses 61 and the establishment of an electrical condition corresponding thereto in the signal register 16 in the manner described, the read-out pulse 62 appears as a negative pulse in the collector circuit of the transistor 30. As described, the shift pulse generator 14 functions in response to the negative pulse to apply a shift pulse to the shift windings 115 through 130. The negative pulse is also applied to the base 181 of the transistor 52 in the read-out pulse generator 23. The negative pulse is of a width and amplitude such that the capacitor 165 charges through resistor 164 sufficiently to cause the base 181 to be biased negatively. Transistor 52 conducts. Reference has already been made to the manner in which capacitors 103, 107 are normally charged negatively from the battery 63. When transistor 52 conducts, capacitors 103, 107 are discharged. Current flows over an electrical path including emitter 186, collector 187, a fifty turn winding 188 on the magnetic core 53, lead 189, the read-out windings 190 through 205 on the magnetic cores 36 through 51, respectively, a two turn winding 206 on the magnetic core 77, resistor 109, capacitor 107 and the parallel connection including lead 108 and capacitor 103. The current pulse in the winding 188 is in the proper polarity to cause the magnetic core 53 to start shifting from a "one" state into a "zero" state. A negative voltage is induced in the winding 182, causing the base 181 to be biased more negatively. Transistor 52 is made to conduct more heavily. The shifting of the magnetic core 53 from a "one" state into a "zero" state is completed. When the magnetic core 53 becomes saturated, the negative bias is removed from the base 181. Capacitor 165 is at this time charged positively, causing transistor 52 to cease conducting and preventing the retriggering thereof. The read-out pulse generator 23 functions in the manner described in response to the read-out pulse included in the incoming code signal to apply a read-out current pulse, for example, of 3 micro-seconds duration, to the read-out windings 190 through 205.

It will be remembered that capacitors 103, 107 are discharged at the time that the shift pulse generator 14 is triggered. Capacitors 103 and 107 are also discharged at the time that the read-out pulse generator 23 is triggered. It is clear, therefore, that the shift pulse generator 14 and read-out pulse generator 23 are held off from being triggered during the same period. By using capacitors 103, 107 in common, the shift pulse generator 14 is held off from being accidentally triggered during the read-out period of operation and the shift pulse generator 14 assists in preventing the accidental triggering of the read-out pulse generator 23 during the read-in period of operation.

Referring to the signal register 16, the read-out windings 190 through 205 are not all mounted on the magnetic cores 36 through 51, respectively, in the same direction. The windings 190, 191, 194, 196, 197, 198, 199, 202, 204, and 205 are mounted on the magnetic cores 36 37, 40, 42, 43, 44, 45, 48,, 50 and 51, respectively, in a direction such that the application of the current pulse from the read-out pulse generator 23 to these windings causes the respective magnetic cores to be shifted into a "zero" state. On the other hand, the windings 192, 193, 195, 200, 201 and 203 are mounted on the magnetic cores 38, 39, 41, 46, 47 and 49 in the reverse direction such that the application of the current pulse thereto from the read-out pulse generator 23 causes the respective magnetic cores to be shifted into a "one" state. It has previously been described how a code signal according to the code signal 60 shown in FIGURE 2 is received and an electrical condition corresponding thereto established in the signal register 16. A "one" is stored in the magnetic cores 38, 39, 41, 46, 47 and 49, a "zero" being stored in the remaining magnetic cores in the signal register 16. As each of the magnetic cores 36 through 51 is already in the state into which it would be otherwise shifted by the current pulse, no shift in the state of any one of the magnetic cores 36 through 51 occurs in response to the current pulse applied to the windings 190 through 205 from the read-out pulse generator 23. The series-connected windings 190 through 205 represent a low inductance such that a high current pulse flows over lead 189 and through the winding 206 on the magnetic core 77. The magnetic core 77 is normally held in a "one" state. The current pulse applied to the winding 206 is of the proper polarity and amplitude to cause the magnetic core 77 to shift from a "one" state into a "zero" state. A positive voltage is induced in a forty turn winding 207 on the magnetic core 77 and applied to the emitter 208 of the transistor 56 in the nonostable multivibrator 54. The width of the B—H curve of core 77 is so adjusted as to enhance the output of desired to undesired voltage.

The multivibrator 54 includes two transistors 56, 55. The emitter 209 of the transistor 55 is connected to the positive terminal of a source of unidirectional potential represented by a 1.5 v. battery 210. A negative biasing voltage is applied to the base 217 over an electrical path including the battery 63, switch 76, lead 86 and resistor 59. Transistor 55 is normally conducting and current flows over an electrical path including emitter 209, collector 211, resistor 212, lead 86, switch 76 and battery 63. The positive going voltage appearing in the collector circuit of transistor 55 is used to bias the base 220 of transistor 56 positive over a lead 213 such that transistor 56 is normally cutoff. The capacitor 57 is normally charged negative with respect to the collector 216 and positive with respect to the base 217. When the magnetic core 77 is shifted into the "zero" state, the positive voltage applied to the emitter 208 causes the transistor 56 to start conducting. Current flows over an electrical path including emitter 208, collector 216 and a winding 214. Capacitor 57 discharges, and a positive going voltage is applied to the base 217. Transistor 55 becomes non-conducting. The negative going voltage appearing in the collector circuit of transistor 55 and applied to the base 220 over lead 213 causes transistor 56 to conduct more heavily. Following a time period determined by the value of the capacitor 57 and resistors 58 and 59, the capacitor 57 discharges to a level such that the voltage applied to the base 217 is sufficiently less positive with respect to the voltage applied to the emitter 209 from the battery 210 to cause the transistor 55 to conduct. The positive going voltage appearing in the collector circuit of the transistor 55 and applied to the base 220 of the transistor 56 causes the transistor 56 to cease conducting. The capacitor 57 re-charges in the polarity indicated above. As a result of this action, the monostable multibrator 54 is reset in its single stable state in which transistor 55 is conducting and transistor 56 is cut-off. Resistor 58 and the shunt capacity to ground of the base circuit of transistor 55 serve to prevent sustained oscillations when the large inductance of winding 214 is in the circuit.

During the period in which transistor 56 is conducting, the winding 214 included in the alarm device 22 is energized. The winding 214 may be, for example, an operate winding included in an electro-magnetically operated switching circuit. The switching circuit functions to operate some type of alarm such as a light or sounding device, indicating that the code signal assigned to the decoder circuit has been received.

When a code signal including an arrangement of half sine wave pulses different than that included in the proper code signal 60 is received and an electrical condition corresponding thereto is established in the signal register 16, one or more of the magnetic cores 36 through 51 will be set in a state opposite from that in which it is set upon the reception of the proper code signal. One or more of the magnetic cores 38, 39, 41, 46, 47 and 49 may be set in a "zero" state rather than in a "one" state and/or one or more of the magnetic cores 40, 42, 43, 44, 45, 48, 50 and 51 may be set in a "one" state rather than in a "zero" state. Upon the application of the current pulse to the read-out windings 190 through 205 by the operation of the read-out pulse generator 23 in response to the read-out pulse included in the incoming code signal, each of the magnetic cores in the wrong state will be shifted into the opposite state according to the direction of the read-out winding mounted thereon. For example, if the first half sine wave pulse appearing at the output of the discriminator 11 should be negative rather than positive, a 'one" will be stored in the magnetic core 51. The read-out winding 205 is mounted on the magnetic core 51 in a direction to shift the magnetic core 51 into a "zero" state upon the application of the current pulse from the read-out pulse generator 23 thereto. Because of this shift in the state of certain of the magnetic cores 36 through 51, set in the wrong state upon the reception of the incoming code signal, the series-connected read-out windings 190 through 205 will present a high inductance. The amplitude of the current pulse in the winding 206 is reduced to a level such that it is insufficient to shift the state of the magnetic core 77. The multivibrator 54 is, therefore, not triggered and the alarm device 22 remains inoperative. By the arrangement described, therefore, the decoder circuit of the invention responds only to a predetermined code signal to activate the alarm device 22. When a different code signal is received and determined, no further action occurs.

The operation of the capacitor 143 and of the corresponding capacitors 225 through 239 in the signal register 16 has been described. The capacitors 143, 225 through 239 are connected to a common ground return over the electrical path including lead 148 and the winding 149 on the magnetic core 150. As the series of half sine wave pulses included in an incoming code signal is fed into the signal register 16 by the operation of the information pulse generator 13 and of the shift pulse generator 14, different ones of the capacitors 143, 225 through 239 will first discharge and then charge through the winding 149 in accordance with the order in which the signal pulses of different polarity are fed to and advanced through the signal register 16. Upon the application of a shift pulse to the windings 115 through 130, one or more of the capacitors 143, 225 through 239 are discharged depending upon which of the magnetic cores 36 through 51 have a "one" stored therein. The capacity discharge current pulse in the winding 149 is of the proper polarity to shift the magnetic core 150 into a "zero" state. A negative voltage is induced in a twenty turn winding 240 connected to the base 241 of a transistor 242, causing the transistor 242 to conduct. A capacitor 243 is normally charged over an electrical path including battery 63, switch 76, lead 86 and resistor 248. When transistor 242 conducts, capacitor 243 discharges and current flows over an electrical path including emitter 244, collector 245, lead 246, a twelve turn winding 247 on magnetic core 77 and capacitor 243. The current pulse in winding 247 is in the proper polarity to set the magnetic core 77 in the "one" state. The particular ones of the capacitors 143, 225 through 239 which have been discharged, charge through the winding 149 with a current of the proper polarity to shift the magnetic core 150 into the "one" state. Also a positive voltage is induced in the winding 240 to aid the cut-off of transistor 242.

In this manner, the magnetic core 150-transistor 242 circuit functions to set and to hold the magnetic core 77 in the "one" state, preventing the accidental triggering of the multivibrator 54 during the read-in period of operation.

The magnetic core 150-transistor 242 circuit performs still another function. Following the reception of some wrong code signals, one or more of the magnetic cores 36 through 51 may be shifted from a "one" state into a "zero" state upon the application of the current pulse from the read-out pulse generator 23 to the windings 190 through 205. If the magnetic core succeeding a magnetic core in the signal register 16 which has been shifted into the "zero" state is in the "one" state, the succeeding magnetic core may also be shifted from the "one" into the "zero" state by the internal operation of the signal register 16. The inductance change brought about by the shifting of the first magnetic core may be cancelled out by the inductance change brought about by the shifting of the succeeding magnetic core. This action may make an incorrect signal code appear correct. If any of the magnetic cores 36 through 51 are shifted from a "one" into a "zero" state upon the application of the current pulse from the read-out pulse generator 23 to the windings 190 through 205, the corresponding ones of the capacitors 143, 225 through 239 are discharged through the winding 149. The magnetic core 150 is shifted into the "zero" state, and transistor 242 becomes conducting. The current pulse in the winding 247 holds the magnetic core 77 in the "one" state, preventing a shift in the state of the magnetic core 77 in response to the current pulse applied to the winding 266. The read-out circuit 15 is in this manner arranged to operate the alarm device 22 only when an electrical condition corresponding to a predetermined or assigned code signal is established in the signal register 16.

While a specific application of the invention is given in FIGURE 2, it is clear that various modifications may be made without departing from the spirit thereof. The read-out circuit 15 has been described as responsive to a negative read-out pulse. By making minor changes understood in the art, the read-out circuits included in certain decoder circuits may be made responsive instead to a positive read-out pulse. This action would effectively double the number of codes that could be handled in a system including a plurality of the decoder circuits of the invention. Further, if the information stored in the signal register 16 is shifted before the signal pulse is applied thereto from the information pulse generator 13 rather than after as described above, an additional core stage in the signal register 16 will become available to increase the storage capacity of the signal register 16. The number of codes that can be handled by a single decoder circuit will be effectively doubled, thereby doubling the number of codes possible in a system including a number of the decoder circuits.

One way in which the magnetic core-transistor circuit used in the signal register 16 of the invention may be constructed is shown in FIGURE 4. Each magnetic core-transistor circuit is constructed as a single unit 250, a number of the units 250 being connected together to form the signal register 16. For the sake of description, the unit 250 shown in FIGURE 4 is assumed to be the second unit of the signal register 16. The transistor 255, magnetic core 37, resistor 166 and capacitor 143 are arranged in the manner shown and supported in a body of non-conducting material 249 such as plastic. The unit may be constructed as a plug-in unit or may be provided with soldering connections as shown. The manner in which the connections are made to the unit 250 can be readily determined by an examination of FIGURE 2. The unit is both small in size and light in weight, making it particularly suitable for use in circuits such as the decoder circuit of the invention, as well as in other applications. The unit 250 is suitable for use in any application where it is desirable to use a magnetic core circuit capable of low average power operation. Maintenance problems are greatly reduced by using the unit 250 since the unit 250 can be easily replaced, and so on.

A decoder circuit is disclosed by the invention offering certain definite advantages over similar circuits previously known. By using magnetic cores and transistors in the manner taught by the invention to perform the necessary functions in place of vacuum tubes and other apparatus, a decoder circuit requiring a small power supply is obtained which is small in size, light in weight and capable of high speeds of operation. In one application, the various doctors, nurses and others who might be called in a hospital may be provided with individual portable light-weight radio receivers each including the decoder circuit of the invention and designed to be carried on the person. The receivers would be provided with selective calling devices each arranged to respond to a different code signal. The radio transmitter may be located at a telephone switchboard and provided with means, for example, a dialing system, to transmit the different code signals.

What is claimed is:

1. A switching device comprising a magnetic core capable of assuming either one of two stable states, means including a first winding on said core for placing said core in one of said states, a regenerative circuit including a current conducting device coupled to said core to bring about a shift in the state of said core from said one state to the other one of said states when said device is made to conduct, a resistor coupled between said circuit and a source of unidirectional potential, a series circuit including a storage device and an output load element, means to connect one end of said series circuit to the junction of said resistor and said regenerative circuit and the other end of said series circuit to a point of reference potential, said storage device being normally charged from said source through said resistor with current flow in one direction through said load element, and means including a second winding on said core for operating said core when in said one state to cause said current conducting device to conduct and to discharge said storage device in the opposite direction through said load element, said current conducting device ceasing conduction upon said core assuming said other state to cause said storage device to thereafter charge from said source in said one direction through said load element and said resistor.

2. In combination, a magnetic device capable of assuming either one of two stable states and having first, second, third and fourth windings thereon, means coupled to said first winding for placing said device in one of said states, a transistor having base, emitter and collector electrodes, a resistor, means to connect said collector electrode through said second winding and said resistor in series to a source of unidirectional potential, means to connect said emitter electrode to a point of reference potential, means to connect said base electrode through said third winding to said point of reference potential, a series circuit including a capacitor and an output load element means to connect one end of said series circuit to the junction of said resistor and said second winding and the other end of said series circuit to said point of reference potential, said capacitor being normally charged in one direction through said element and through said resistor from said source, means connected to said fourth winding to operate said device when in said one state to cause said transistor to conduct by the discharge of said capacitor through said element in the opposite direction, said transistor conducting only until said device assumes said other state permitting said capacitor to thereafter recharge from said source.

3. A switching device comprising a magnetic core capable of assuming either one of two stable states, means including a first winding on said core for placing said core in one of said states, a transistor having at least an input, an output and a common electrode, means connecting said common electrode to a point of reference potential, a second and third winding on said core, a resistor, means to connect said output electrode through said second winding and said resistor in series to a source of unidirectional potential, means to connect said input electrode through said third winding to said point of reference potential, a series circuit including a capacitor and an output load device, means to connect one end of said series circuit to the junction of said resistor and said second winding and the other end of said series circuit to said point of reference potential to cause said capacitor to be normally charged from said source with current flow through said resistor and in one direction through said load device, a fourth winding on said core, means connected to said fourth winding to shift said core when in said one state to its second state by causing said transistor to conduct so as to discharge said capacitor with current flow through said load device in the opposite direction, said transistor ceasing conduction upon said core assuming said second state to cause said capacitor to thereafter charge from said source with current flow through said resistor and said load device in said one direction.

4. A switching device comprising a magnetic core capable of assuming either one of two stable states, means including a first winding on said core for placing said core in one of said states, a transistor having at least an input, an output and a common electrode, means to connect said common electrode to a point of reference potential, a second and third winding on said core, a resistor, means to connect said output electrode through said second winding and said resistor in series to a source of unidirectional potential, means to connect said input electrode through said third winding to said point of reference potential, a second magnetic core capable of assuming either one of two stable states and having a fourth winding thereon, a capacitor, means to connect one side of said capacitor through said fourth winding to the junction of said resistor and said second winding and to connect the other side of said capacitor to said point of reference potential, said capacitor being normally charged from said source through said fourth winding and said resistor, a fifth winding on said first core, means connected to said fifth winding to shift said first core when in said one stable state to its second stable state by causing said transistor to conduct, said capacitor being discharged upon the conduction of said transistor with current flow through said fourth winding in a direction producing a current pulse in said fourth winding of a polarity to cause said second core to be placed in one of its stable states, said transistor ceasing conduction upon said first core assuming its second stable state to allow said capacitor to thereafter charge from said source by current through said fourth winding in the opposite direction producing a current pulse in said fourth winding of a polarity to place said second core in the second stable state thereof.

References Cited in the file of this patent

UNITED STATES PATENTS 2,926,339 Kramer et al. ---------- Feb. 3, 1960

OTHER REFERENCES

IRE Publication: IRE Convention Record, Part 4, pages 84–94, March 21–24, 1955.

Navy Publication: Basic Electronics (Navy Training Courses), Navpers 10087, 1955, pages 149–150.